US008463548B2

(12) United States Patent
Gies

(10) Patent No.: US 8,463,548 B2
(45) Date of Patent: Jun. 11, 2013

(54) DRILL BIT TRACKING APPARATUS AND METHOD

(75) Inventor: Paul D. Gies, Redwood Meadows (CA)

(73) Assignee: Athena Industrial Technologies, Inc. (CA)

(*) Notice: Subject to any disclaimer, the term of this patent is extended or adjusted under 35 U.S.C. 154(b) by 495 days.

(21) Appl. No.: 12/670,468

(22) PCT Filed: Jul. 23, 2008

(86) PCT No.: PCT/CA2008/001356
§ 371 (c)(1),
(2), (4) Date: Aug. 11, 2010

(87) PCT Pub. No.: WO2009/012591
PCT Pub. Date: Jan. 29, 2009

(65) Prior Publication Data
US 2010/0305864 A1  Dec. 2, 2010

Related U.S. Application Data

(60) Provisional application No. 60/951,356, filed on Jul. 23, 2007.

(51) Int. Cl.
*G01V 1/00* (2006.01)
(52) U.S. Cl.
USPC .......................................................... 702/9
(58) Field of Classification Search
USPC ............ 702/6, 9, 39, 48, 56, 75, 94, 103, 702/142, 150, 159, 171, 188; 175/45, 50; 367/23, 35, 75; 166/249
See application file for complete search history.

(56) References Cited

U.S. PATENT DOCUMENTS 3,876,016 A * 4/1975 Stinson ........................... 175/45
4,469,175 A   9/1984 Massa
(Continued)

FOREIGN PATENT DOCUMENTS

WO  WO 01/21928 A2   3/2001
WO  WO 2005/054628 A1  6/2005

OTHER PUBLICATIONS

International Search Report dated Oct. 29, 2008, issued in corresponding international application No. PCT/CA2008/001356.

Primary Examiner — Mohamed Charioui
(74) Attorney, Agent, or Firm — Ostrolenk Faber LLP

(57) ABSTRACT

An apparatus is provided for assessing the location of a drill bit underground. The apparatus includes an acoustic sound generator that is driven by the drilling mud supplied to the drill bit. The sound generator a characteristic string of pulses, which may be termed a signature or key. The key is repeated over and over. Monitors (i.e., sensors) at the surface listen for this key. The key is distorted by the inconstant angular velocity of the drill bit. Thus the observed data do not precisely match the key. On the basis of numerical algorithms, a digitally revised reference signal or key, is identified to map the known reference key onto the best fitting observed data. The correction factors are then applied to map the modified reference key onto the data observed at other sensors of an array of sensors mounted on the surface. By determining the phase shift and travel time of the signals at the various sensors, and having determined the speed of wave propagation in the geological media, the position of the bit, or a fairly close approximation thereof, may be obtained. The correction factors applied to the reference key may also tend to permit the actual rotational speed of the drill bit to be determined.

19 Claims, 8 Drawing Sheets

U.S. PATENT DOCUMENTS

| | | | |
|---|---|---|---|
| 6,208,586 B1 * | 3/2001 | Rorden et al. | 367/35 |
| 6,614,360 B1 | 9/2003 | Leggett et al. | |
| 6,781,521 B1 | 8/2004 | Gardner et al. | |
| 7,035,165 B2 | 4/2006 | Tang | |
| 7,061,830 B2 | 6/2006 | Mallison et al. | |
| 7,084,782 B2 | 8/2006 | Davies et al. | |
| 2006/0096752 A1 * | 5/2006 | Arnoldo Barrientos et al. | 166/249 |
| 2006/0254819 A1 | 11/2006 | Moriarty | |
| 2006/0266552 A1 * | 11/2006 | Hutchinson | 175/50 |

* cited by examiner

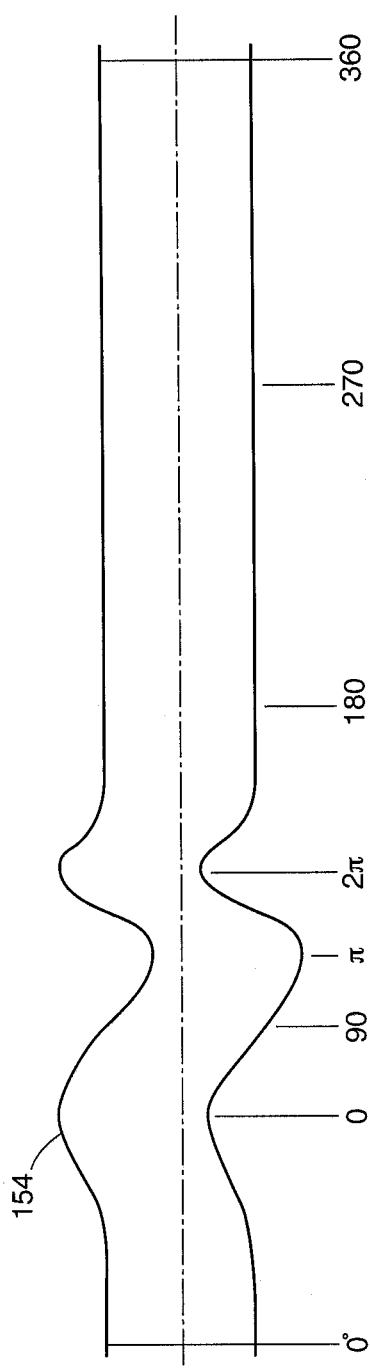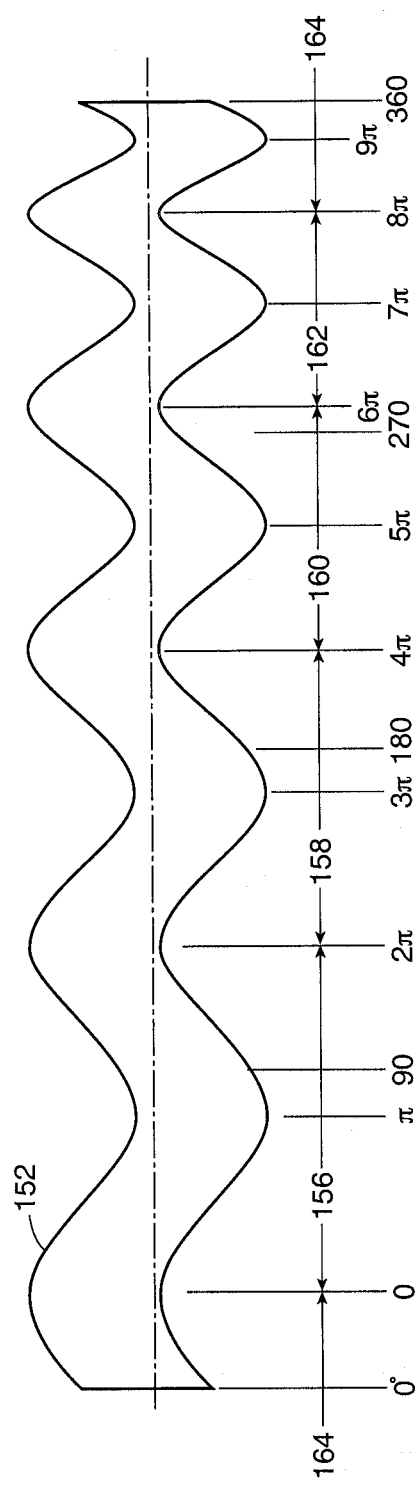

DRILL BIT TRACKING APPARATUS AND METHOD

CROSS REFERENCE TO RELATED APPLICATIONS

The present application is a 35 U.S.C. §371 National Phase conversion of PCT/CA2008/001356, filed Jul. 23, 2008, which claims benefit of U.S. Provisional Application No. 60/951,356, filed Jul. 23, 2007, the disclosure of which is incorporated herein by reference. The PCT International Application was published in the English language.

FIELD OF THE INVENTION

This invention relates to the field of tracking objects in a subterranean medium. Such objects may include drill bits.

BACKGROUND OF THE INVENTION

The determination of the location of a distant subterranean object may be of considerable commercial importance in the fields of well drilling, tunnel boring, pipeline laying under rivers or other surface obstructions, hard rock mining, and so on. In hydrocarbon extraction, a drill string may be 3 to 6 inches in diameter, and yet may extend many thousands of feet into the ground. Given the non-homogeneity of the underlying geological structure, and the tendency for drill bits to wander, it may be difficult to know with reasonable accuracy precisely where the drill bit may be. This issue may tend to have enhanced importance in the context of, for example, directional drilling, where it may be desired to follow a relatively narrow and possibly undulating geological feature, such as a coal seam, a hydrocarbon payzone for oil or gas extraction, an ore vein or pipe, such as a kimberlite pipe from which a mineral or other resource is to be extracted, or the boring of a utility conduit in an urban area.

There are known methods of addressing these issues, sometimes termed borehole telemetry. A typical system might involve magnetic sensors that indicate azimuth angle (i.e., compass direction relative to North) and angle of dip. Gyroscopic (i.e., inertial) and magnetic sensors have been used for some time. Adjustments in drilling may occur on the basis of these signals. It may also be noted that while borehole telemetry may pertain to the absolute position of a drill head, it may also refer to, and have significant commercial importance in relation to, the relative position of one bore hole to another, as in steam assisted gravity drainage (SAGD) or of bore position relative to a geological boundary structure. This problem is discussed in U.S. Pat. No. 7,084,782 of Davies et al., issued Aug. 1, 2006, generally from col. 1, line 16 to col. 5, line 17, and particularly at column 2, lines 3-53, all of which is incorporated herein by reference. Among other items, Davies at el., note that:

(a) The drilling operation, and mud motor life, may be optimized by the real time transmission of, and adjustment of drilling operations in response to, measurement data of natural gamma rays, borehole inclination, borehole pressure, resistivity of the formation and, mud motor bearing temperature, and weight on the bit.

(b) When used with a downhole motor, the mud pulse telemetry system is typically located above the mud motor so that it is spaced a substantial distance from the drilling bit to protect the electronic components from the effects of vibration. As a result, the measured environmental data may not necessary correlate with the actual conditions at the drilling bit. A conventional telemetry system may have a depth lag (i.e., a distance offset) of up to or greater than 60 feet. It is possible to drill out of a hydrocarbon producing formation before detecting the exit, resulting in the need to drill several meters of borehole to get back into the pay zone. The interval drilled outside of the pay zone results in lost production revenue and may include wasted costs for completing that non-producing interval.

(c) Near bit sensor systems have been developed to provide early detection of changes to the formation while drilling, but may still be located a spaced distance from the drill bit assembly, giving a lag in determination of formation changes. Mounting sensors in a mud motor may be very costly and may reduce system reliability.

(d) Systems permitting relatively high rate, bi-directional, data transmission have been developed for sending data to the surface through an electrical line. However, a drill string wireline or cable is subject to stress at pipe connections; may be prone to wear, damage or destruction during normal drilling operations; and may be somewhat unreliable and prone to failure.

(e) Systems have also been developed for the downhole generation and transmission of acoustic or seismic signals or waves through the drill string or surrounding formation. However, a relatively large amount of downhole power is typically required to generate sufficient signal strength for surface detection. A relatively large power source must be provided or repeaters can be used at intervals along the string to boost the signal as it propagates.

This problem is also discussed in U.S. Pat. No. 7,035,165 of Tang, at col. 1, line 35 to col. 2, line 5: "Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several bends and turns along the drill path. Such three dimensional borehole profiles allow hydrocarbon recovery from multiple formations and allow optimal placement of wellbores in geologically intricate formations."

"Hydrocarbon recovery can be maximized by drilling the horizontal and complex wellbores along optimal locations within the hydrocarbon-producing formations (payzones). Crucial to the success of these wellbores is (1) to establish reliable stratigraphic position control while landing the wellbore into the target formation and (2) to properly navigate the drill bit through the formation during drilling. In order to achieve such wellbore profiles, it is important to determine the true location of the drill bit relative to the formation bed boundaries and boundaries between the various fluids, such as the oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir. Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface seismic maps, location of the drilling assembly relative to the bed boundaries of the formation around the drilling assembly can greatly enhance the chances of drilling boreholes for maximum recovery. Prior art downhole lack in providing such information during drilling of the boreholes".

"Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water around and/or a short distance in front of the drill bit. Resistivity measurements are most commonly utilized to navigate or "geosteer" the drill bit. However, the depth of investigation of the resistivity devices usually extends to 2-3 meters. Resistivity measurements do not provide bed boundary information relative to the downhole subassembly. Furthermore, error margin of the depth-measuring devices, usually deployed on the surface, is frequently greater than the depth of investigation of the resistivity devices. Thus, it is desirable to have a downhole system which can relatively accurately map the bed boundaries around the downhole subassembly so that the drill string may be steered to obtain optimal borehole trajectories."

"Thus, the relative position uncertainty of the wellbore being drilled and the important near-wellbore bed boundary or contact is defined by the accuracy of the MWD directional survey tools and the formation dip uncertainty. MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2.degree. Such an error translates into a target location uncertainty of about 3.0 meters per 1000 meters along the borehole. Additionally, dip rate variations of several degrees are common. The optimal placement of the borehole is thus very difficult to obtain based on the currently available MWD measurements, particularly in thin pay zones, dipping formation and complex wellbore designs."

Commentary on downhole telemenetry is provided in U.S. Pat. No. 6,781,521, of Gardner et al., which issued on Aug. 24, 2004 in the context of transmitting downhole data to the surface during measurement while drilling (MWD) (See col. 1, line 46 to col. 2, line 57), as follows: "Heretofore, in this field, a variety of communication and transmission techniques have been attempted to provide real time data from the vicinity of the bit to the surface during drilling. The utilization of MWD with real time data transmission provides substantial benefits during a drilling operation. For example, continuous monitoring of downhole conditions allows for an immediate response to potential well control problems and improves mud programs."

"Measurement of parameters such as bit weight, torque, wear and bearing condition in real time provides for more efficient drilling operations. In fact, faster penetration rates, better trip planning, reduced equipment failures, fewer delays for directional surveys, and the elimination of a need to interrupt drilling for abnormal pressure detection is achievable using MWD techniques."

"At present, there are four major categories of telemetry systems that have been used in an attempt to provide real time data from the vicinity of the drill bit to the surface; namely, mud pressure pulses, insulated conductors, acoustics and electromagnetic waves."

"In a mud pressure pulse system, the resistance of mud flow through a drill string is modulated by means of a valve and control mechanism mounted in a special drill collar near the bit. This type of system typically transmits at 1 bit per second as the pressure pulse travels up the mud column at or near the velocity of sound in the mud. It is well known that mud pulse systems are intrinsically limited to a few bits per second due to attenuation and spreading of pulses."

"Insulated conductors, or hard wire connection from the bit to the surface, is an alternative method for establishing downhole communications. This type of system is capable of a high data rate and two way communication is possible. It has been found, however, that this type of system requires a special drill pipe and special tool joint connectors which substantially increase the cost of a drilling operation. Also, these systems are prone to failure as a result of the abrasive conditions of the mud system and the wear caused by the rotation of the drill string."

"Acoustic systems have provided a third alternative. Typically, an acoustic signal is generated near the bit and is transmitted through the drill pipe, mud column or the earth. It has been found, how ever, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission."

"The fourth technique used to telemeter downhole data to the surface uses the transmission of electromagnetic waves through the earth. A current carrying downhole data signal is input to a toroid or collar positioned adjacent to the drill bit or input directly to the drill string. When a toroid is utilized, a primary winding, carrying the data for transmission, is wrapped around the toroid and a secondary is formed by the drill pipe. A receiver is connected to the ground at the surface where the electromagnetic data is picked up and recorded. It has been found, however, that in deep or noisy well applications, conventionals electromagnetic systems are unable to generate a signal with sufficient intensity to be recovered at the surface."

"In general, the quality of an electromagnetic signal reaching the surface is measured in terms of signal to noise ratio. As the ratio drops, it becomes more difficult to recover or reconstruct the signal. While increasing the power of the transmitted signal is an obvious way of increasing the signal to noise ratio, this approach is limited by batteries suitable for the purpose and the desire to extend the time between battery replacements. It is also known to pass band filter received signals to remove noise out of the frequency band of the signal transmitter. These approaches have allowed development of commercial borehole electromagnetic telemetry systems which work at data rates of up to four bits per second and at depths of up to 4000 feet without repeaters in MWD applications. It would be desirable to transmit signals from deeper wells and with much higher data rates which will be required for logging while drilling, LWD, systems."

The problem of transmitting encoded data by acoustic signals is also discussed in U.S. Pat. No. 6,614,360 of Leggett et al., issued Sep. 2, 2003, who suggest that much preliminary data processing may occur downhole (See col. 3, line 60 to col. 4, line 30):

"Wireline acoustic technology has been particularly difficult to adapt to MWD applications. In addition to road noise generated by the drilling assembly dragging against the wall of the borehole, there is an additional source of noise generated by the rotation of the drill bit and the drill string. Further, the slotted isolation sub technique used to isolate transmitters and receivers in wireline applications can not be used in MWD applications in that such slots would mechanically weaken the MWD acoustic subassembly to the failing point. In addition, the previously described full wave wireline acoustic measurement generates tremendous amounts of digital data. These data exceed the telemetry rates and storage capacities of current MWD systems thereby eliminating the option of processing full wave acoustic data at the surface. This problem is compounded when other types of sensors, comparable in sophistication to corresponding wireline applications, are run in combination with full wave acoustic devices. As an example, it is not feasible using current MWD telemetry capacity to transmit simultaneously a plurality of full acoustic wave forms or gamma ray energy spectra or electromagnetic wave attenuation and phase shift data, or a combination thereof, to the surface for processing to determine parameters of interest at depth intervals sufficient to obtain the required vertical resolution of the penetrated formations. The simultaneous transmission of drilling management sensor information such as directional information, weight on the drill bit, and other non formation evaluation type measurements still further overloads current MWD telemetry transmission rates which are of the order of 2 to 60 bits per second. Furthermore, it is not feasible to store copious amounts of raw data downhole sensor data for subsequent retrieval and processing due to relatively limited storage capacity of current MWD systems. Acoustic and other MWD methods for making multiple formation and borehole evaluation type parametric determinations comparable to current wireline measurements require the computation of the desired parameters downhole, and the transmission of the computed parameters of interest to the surface. By using downhole computational methods, the transmission requirements are reduced by orders of magnitude in that only "answers" are telemetered rather than raw data. This type of downhole computation is also applicable to other types of non formation evaluation type measurements such as signals indicative of the operational characteristics of the downhole equipment as well as measurements indicative of drilling direction and efficiency."

In summary, the downhole environment may not be benign. It may be relatively hot. There may be abrasive and reactive fluids. Equipment used to drill rock may be subject to unhelpfully harsh shock and vibration spectra. Consequently, the use of electrical sensing and telecommunication equipment and electrical connections in a downhole environment may not always work well. Second, the sensing equipment may tend to be relatively fragile, and so may tend to be placed behind the mud motor in a coiled tubing system. The use of acoustic signal transmission is known, but so too are problems with acoustic attenuation, and with the rather limited data transmission rate. Further, it may be difficult to send acoustic signals in an acoustically noisy environment given the very significant noise generation of the bit itself.

The present inventor has taken a different approach.

SUMMARY OF THE INVENTION

In an aspect of the invention there is a subterranean position detection apparatus for detecting the position of a drill bit of a drill string. It includes an acoustic signal generator (ASG), the ASG being mounted in proximity to the drill bit. The ASG has a known acoustic signature. Sensors are mounted remote from the drill bit. The sensors are mounted to monitor subterranean sound in the neighbourhood of the drill string. The sensors include a number of sensors sufficient to triangulate position. A signal processor is connected to receive observations from the sound sensors. The processor is operable to establish a correlation between (a) data from a first, or reference, sensor and (b) the reference signature. The processor is operable to apply the correlation to data received at others of the sensors and to measure respective phase shifts and total travel time therebetween. The processor is operable to employ the computed results to estimate position of the drill bit.

In another feature, of that aspect of the invention, the ASG is a control sound generator. In a further feature, the drill string includes a mud motor, and the ASG is located between the mud motor and the drill bit. In another feature the ASG is powered by a flow of drilling mud. In another feature the ASG has two signatures, or a signature with two parts. In another feature the ASG includes a first portion and a second portion, and the signature includes a first component emitted by the first portion and a second component emitted by the second component. In still another feature the first component is emitted at a different rate than the second component. In a further feature the signature includes a waveform of varied wavelengths. In still another feature the first and second components each include a waveform of varied wavelengths. In another feature the signature is an acoustic signature and the first sensor is mounted to monitor sound transmitted in the drill string. In still yet another feature the array of sensors includes at least three sensors other than the first sensor. In again a further feature the array of sensors includes at least four sensors other than the first sensor. In still yet another further feature the apparatus includes a satellite communications data uplink and a remote data processing facility. In another feature the apparatus includes a mount for the drill bit. In still another feature the apparatus is mounted within a mud motor sub. In yet a further feature the apparatus is operable to impose a pressure wavetrain in drilling mud supplied to the drill bit. In again another feature the apparatus includes a piston and cam follower operable to produce at least a portion of the signature. In a still further feature the signature includes a first key having a first number of oscillations, the oscillations having different wavelengths from each other; a second key having a second number of oscillations, the oscillations having different wavelengths from each other; and the first and second keys are emitted at different rates. In a further additional feature, the rates have a prime number relationship. In another feature, the ASG includes at least one speed reduction apparatus.

In another aspect of the invention there is a method of locating a drill bit of a drill string in a subterranean location. The method includes providing a drill string having a drill bit and an ASG in a location proximate to the drill bit, the ASG being provided with a known reference acoustic signature; providing an array of subterranean acoustic sensors; operating the ASG to emit the acoustic signature during operation of the drill bit; comparing data from a first sensor with the known reference acoustic signature; computationally creating a modified reference acoustic signal matching the acoustic signature as emitted from the bit; comparing data from a plurality of other ones of the sensors with the modified reference acoustic signal to find the emitted acoustic signature in the data from the plurality of other ones of the sensors; determining phase shift of the emitted acoustic signature at each of the other sensors relative to the first sensor; and estimating (i.e., by calculation) the position of the drill bit based on comparison of the phase shifts.

In a feature of that aspect of the invention, the signature includes first and second components, the first component and the second component being emitted at first and second rates, the first and second rates being different. In another feature, the different rates differ by a prime number relationship. In still another feature, at least one of the acoustic signature includes first and second parts, each of the parts having a non-repeating series of pulses, and the method includes repeatedly emitting the non-repeating series of pulses.

In another feature, the first part of the signature is a part having fewer pulses per unit of time than the second part, and comparing data from the first sensor includes comparing the data with the first part of the signature, adjusting the modified reference signature on that comparison, modifying the second part of the modified reference signal according to adjustments made to the first part, and looking for the second part of the modified reference signal amongst data received at each of the other sensors. In another additional feature, the method includes the use of fourier transforms. In another feature, the method includes sampling at successive time slices, multiplying the modified reference signal by the data observed at those time slices, squaring and summing the results, finding the phase shift of the observed data yielding the largest such summed result, and recording the time difference between that slice and the corresponding largest summed result slice obtained from data received at the first sensor. In another feature, the correction factors determined in matching observed data to reference data are reverse applied to produce a plot of drill bit rotational speed as a function of time.

In another aspect of the invention, there is an acoustic signal generator for use in subterranean formations remote from an operator. The acoustic signal generator has at least a first moving member connected to be driven and at least a first schedule, the schedule defining a mechanical noise signature. The moving member being mounted to move according to the schedule, and, in so doing, to emit a time varying mechanical signal having a known signature corresponding to the schedule.

In a feature of that aspect of the invention, there is a fitting to connect the moving member to a revolving shaft, whereby power to operate the acoustic signal generator is transmitted predominantly through the shaft. In another feature, the first schedule has the form of a cam, and one of (a) the moving member is driven to follow the cam; and (b) the cam is driven and the moving member moves in consequence of motion of the cam. In yet another feature the acoustic signal generator also includes at least a second schedule, the first and second schedules being different.

In another feature the generator includes speed altering apparatus operable to drive the at least a first moving member at a first speed relative to the first schedule and a second speed relative to the second schedule, the first and second speeds being different. In a further feature the acoustic signal generator includes a housing mountable to a drill string of a drill rig between a mud motor and a drill bit, motion transmission members connected to drive at least one of (a) the first moving member and (b) the first schedule, from an output shaft driven by the mud motor. In still yet another feature the signal generator includes a chamber for containing a fluid, and at least the first moving member is operable to imposes pressure fluctuations in the fluid.

In a further aspect of the invention, there is an acoustic signal generator for use in subterranean formations. The acoustic signal generator has an enclosure defining a chamber for accommodating a fluid; at least one member operable to impose pressure fluctuations in the fluid; and at least one schedule. The member is mounted to be driven according to the at least one schedule, thereby to impose pressure variations in the fluid having a known signature.

In a feature of that aspect of the invention, the apparatus includes fittings for mounting the acoustic signal generator in a drill string between a mud motor and a drill bit. In another feature, the enclosure has a port to permit fluid to move in and out of the chamber. In still another feature the chamber has a connection fitting permitting the chamber to mounted in fluid communication with a supply of drilling mud. In a further feature, the generator includes at least the first schedule and a second schedule and a speed altering member, the at least one moving member being connected to impose pressure fluctuations in the fluid according to at least the first schedule and the second schedule, the speed altering member being mounted to cause the at least one moving member to move at a first speed relative to the first schedule and a second speed relative to the second schedule. In still another feature the signal generator has a housing defining the enclosure, the housing being mountable to a mud motor of a drill string, the signal generator has drive fitting by which to drive the generator from a shaft output of the mud motor, the chamber having ports by which drilling mud from the mud motor can communicate with the chamber, and the at least one member operable to impose pressure fluctuations includes at least one reciprocating piston, the at least one schedule includes a cam, and the piston is driven by a cam follower co-operably mounted to the cam.

In yet another feature, there is the use of the subject matter of any of the apparatus or methods to provide an estimate of location of a subterranean drill bit. And, still another feature includes the method of using any of the apparatus of any of the aspects or features to provide an estimate of location of a subterranean drill bit, whether according to the method aspect or features noted above in their various possible permutations and combinations, or according to other features and aspects described herein below.

BRIEF DESCRIPTION OF THE ILLUSTRATIONS

The invention may be explained with the aid of the accompanying illustrations, in which:

FIG. 1b is a plan view of the geological formation of FIG. 1a;

FIG. 2a is a side view of an end portion of a drill string of the drill rig of FIG. 1a;

FIG. 3b shows an alternate embodiment of acoustic signal generator to that of FIG. 3a;

FIG. 3c shows a further alternate embodiment of acoustic signal generator to that of FIG. 3a;

FIG. 3d shows another alternate embodiment of acoustic signal generator to that of FIG. 3a;

FIG. 4a shows a first schedule for the a cam of the acoustic signal generator of FIG. 2b; and FIG. 4b shows a second schedule for another cam of the ASG of FIG. 2b.

DETAILED DESCRIPTION

Figure 1A:
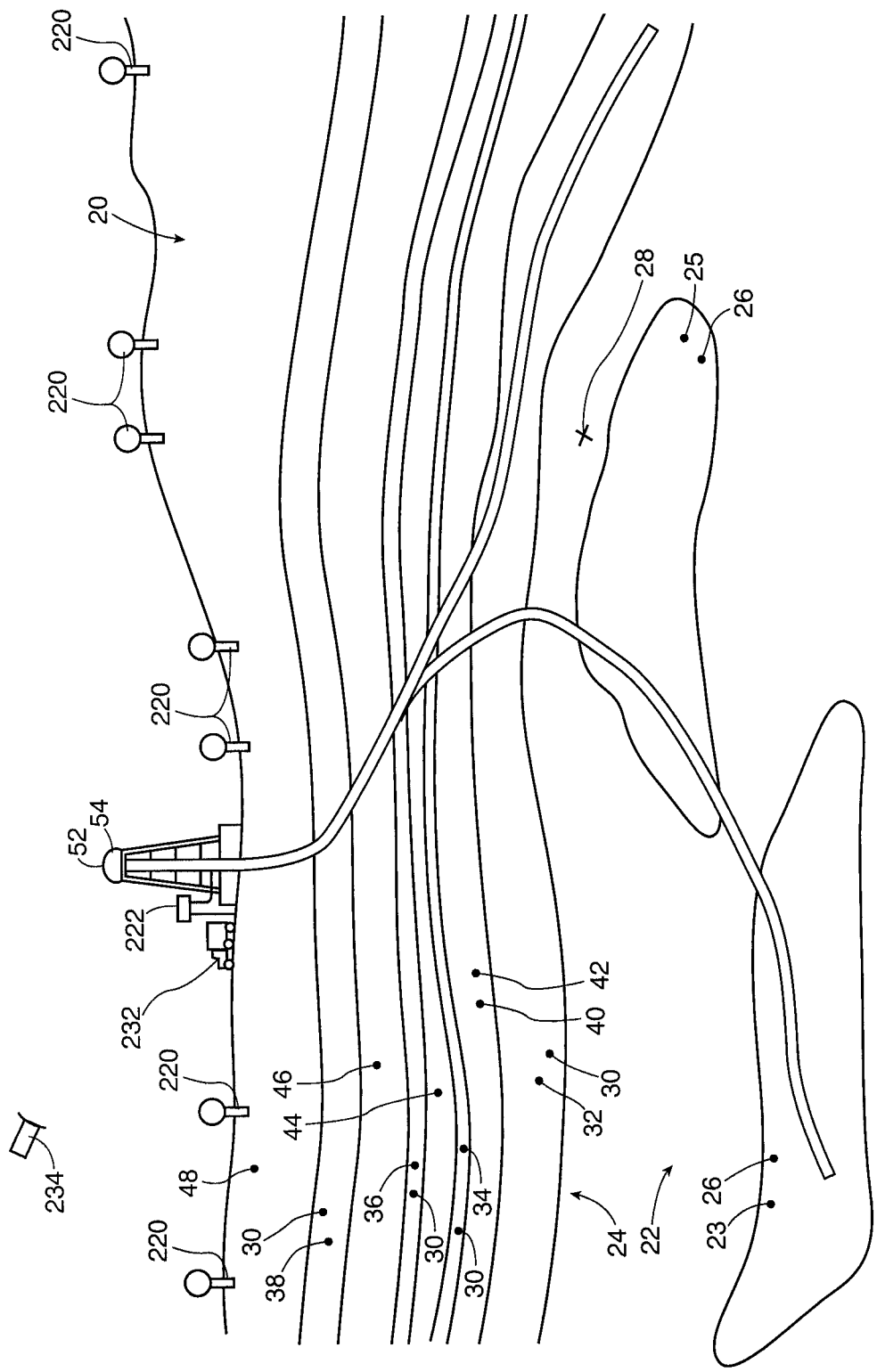
FIG. 1a is a general representation in cross-section of a geological formation establishing an example of a context to which the description that follows may apply, and includes an embodiment of drill rig incorporating aspects of the present invention.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated, the more clearly to depict certain features of the invention.

The terminology used in this specification is thought to be consistent with the customary and ordinary meanings of those terms as they would be understood by a person of ordinary skill in the art in North America. Following from the decision of the Court of Appeal for the Federal Circuit in Phillips v. AWH Corp., and while not excluding interpretations based on other sources that are generally consistent with the customary and ordinary meanings of terms or with this specification, or both, on the basis of other references, the Applicant expressly excludes all interpretations that are inconsistent with this specification, and, in particular, expressly excludes any interpretation of the claims or the language used in this specification such as may be made in the USPTO, or in any other Patent Office, unless supported by this specification or in objective evidence of record in accordance with In re Lee, such as may demonstrate how the terms are used and understood by persons of ordinary skill in the art, or by way of expert evidence of a person or persons of experience in the art.

In terms of general orientation and directional nomenclature, two types of frames of reference may be employed. First, inasmuch as this description pertains to drill bits that most typically are driven rotationally about an axis of rotation, and that advance along that axis, and although a well may not necessarily be drilled vertically, terminology may be employed assuming a cylindrical polar co-ordinate system in which the nominally vertical, or z-axis, may be taken as running along the bore of the well, and may be defined by the axis of rotation of the drill bit or the centerline of the bore. The circumferential direction is that through which angles, angular velocity, and angular accelerations, (typically theta, omega and alpha) may be measured, often from an angular datum, or angular direction, in a plane perpendicular to the axial direction. The radial direction is defined in the plane to which the axial direction is normal, may be taken as having the centerline of the bore as the origin, that bore being taken as being, at least locally, the center of a cylinder whose length is many times its width, with all radial distances being measured away from that origin.

The second type of terminology uses the well head as a point of reference. As may be appreciated, while there is a local polar-cylindrical co-ordinate system, the bore need not be straight, and in horizontal or directional drilling is unlikely to be straight, but may tend to curve or deviate, and may do so deliberately according to deliberate steering. In this context, the bore may have an azimuth or compass direction, an angle of inclination (i.e., a dip angle), and may proceed on a given radius of curvature, which itself may vary. In this frame of reference, "upstream" may generally refer to a point that is further away from the outlet of the well, and "downstream" may refer to a location or direction that is closer to, or toward, the outlet of the well. In this terminology, "up" and "down" may not necessarily be vertical, given that slanted and horizontal drilling may occur, but may be used as if the well bore had been drilled vertically, with the well head being above the bottom of the well. In this terminology, it is understood that production fluids flow up the well bore to the well head at the surface. Finally, it may be desired to convert from this frame of reference to a grid or map reference with a depth, which, though formally a polar co-ordinate system (latitude, longitude, and depth) is, at the scale of interest essentially Cartesian (two horizontal grid references, pus a vertical reference for depth).

Considering FIG. 1a, which is not drawn to scale, and which is intended to convey conceptual understanding, by way of a broad, general overview and only for the purposes of illustration, a geological formation is indicated generally as 20. Geological formation 20 may include a first mineral producing region 22, and a second mineral producing region 24 (and possibly other regions above or below regions 22 and 24). Region 22 may be below region 24, possibly significantly below. For example, region 22 may generally lie perhaps 1000-7000 m below the surface, whereas region 24 may tend to lie rather less than 1000 m from the surface.

Region 22 may include one or more pockets or strata 23, 25 that may contain a fluid that is trapped in a layer 26 by an overlying layer 28 that may be termed a cap. The cap layer 28 may be substantially impervious to penetration by the fluid. In some instances the fluid in layer 26 may be a mixture having a significantly, or predominantly, hydrocarbon based component, and may include impurities whether brine, mud, sand, sulphur or other material which may be found in various types of crude oil. It may also include hydrocarbon gases, such as natural gas, propane, butane, and so on, and various impurities as may be. The fluid may be under low, modest, or quite high pressure. The vertical through thickness of the potential or actual production zone of region 22 may be of the order of less than 10 ft, to several hundred feet, or perhaps even a few thousand feet. The overburden pressures in this zone may be quite substantial, possibly well in excess of 10,000 psi.

Figure 1B:
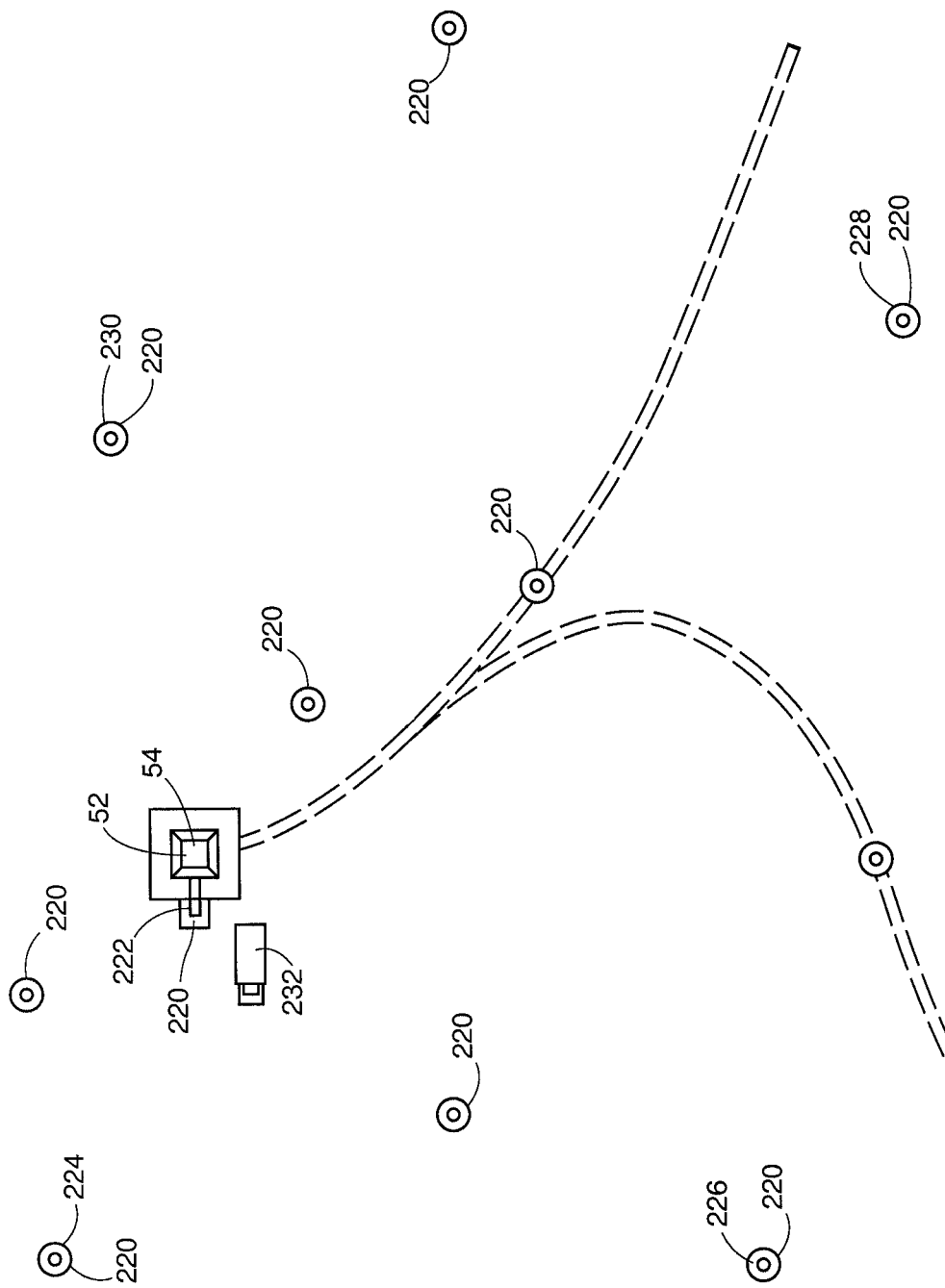

Region 24 may include one or more mineral bearing seams, indicated generally as 30, and individually in ascending order as 32, 34, 36, and 38. It may be understood that FIG. 1 is intended to be generic in this regard, such that there may only be one such seam, or there may be many such seams, be it a dozen or more. Seams 32, 34, 36, and 38 are separated by interlayers indicated generally as 40, and individually in ascending order as 42, 44, 46, and an overburden layer 48 (each of which may in reality be a multitude of various layers), the interlayers and the overburden layer being relatively sharply distinct from the mineral bearing seams 30, and relatively impervious to the passage of fluids such as those that may be of interest in seams 32, 34, 36 and 38. It may be noted that seams 30 may be of varying thickness, from a few inches thick to several tens of feet thick. Seams 30 may, for example, be coal seams. One or more of those mineral bearing seams may be porous, to a greater or lesser extent such that, in addition to the solid mineral, (which may be coal, for example), one or more of those seams may also be a fluid bearing stratum (or strata, as may be), the fluid being trapped, or preferentially contained in, that layer by the adjacent substantially non-porous interlayers. The entrapped fluid may be a gas. Such gas may be a hydrocarbon based gas, such as methane. The entrapped fluid may be under modest pressure, or may be under relatively little pressure. It may be that the operator wishes to drill along one of these relatively thin stratified formations in an attempt to enhance recovery. Alternatively, the operator may wish to drill a path from one relatively small potential production pocket 23 to another 25, so linking and making economically viable, the recovery from deposits that would not otherwise merit recovery.

In directional drilling, the drill bit may typically be mounted at the end of a coil that is conveyed down the bore from a drill rig located at the surface. The drill string is most typically 3½, 4, 4½, or 5 inches in diameter, and is made of sections of hollow pipe, usually ½ inch thick. Cutting fluid, in the nature of water or drilling mud is forced down the inside of the hollow drill string under pressure, and flows back up the generally annular space about the drill string, and back to the surface. The deeper the well, the higher proportion of drilling mud as opposed to water. The drilling mud is driven by pumps, which are usually duplex or triplex pumps. A duplex pump is a double acting reciprocating pump. A triplex pump is a positive displacement, reciprocating pump that has three plungers. Triplex pumps are the most commonly used pump configuration for drilling and well service operations. Both duplex and triplex pumps tend to yield a vibrating or pulsating effect in the drilling fluid, an effect that may be more pronounced when duplex pumps are used. A duplex pump running at 60 r.p.m. will emit 240 pulsations per minute, a triplex single acting pump will emit 180 pulses per minutes. These pulses can be observed in the drill string. Output flow may be of the order of 1.0 to 2.0 cubic meters per minute, or roughly 4 to 8 U.S. gallons per second. More commonly the flow rate may be in the range of 1.3 to 1.6 cubic meters per minute. For a hollow pipe having an internal bore of 2¼ or 2½ inches, this will give a velocity of roughly 20 to 30 ft/s. The pressure at the outlet of the pump may be in the range of about 400 or 500 to about 1500 p.s.i., and may run in the narrower band of about 800 p.s.i. to about 1000 p.s.i.

A drill string may have a very high aspect ratio of length to diameter, and a certain overall springiness or resilience both longitudinally and torsionally. The lower end of the drill string may include a number of sections of drill collars. Drill collars are often thick walled steel pipe sections about 30 ft long, and may have an inside diameter of 2¼ or 2½ inches, and an outside diameter of 5 or 6 inches. A drill string may have e.g., 18 or 24 such drill collars at the bottom end. These drill collars may tend to function somewhat like a plumb bob. A conveyed drill string may include a mud motor, which may be mounted below the drill collars. The mud motor is a kind of hydraulic motor driven by the flowing drilling mud. The rotational speed of the bit itself is then the sum of the rotational speed of the drill string (if it is rotating), plus the rotational speed of the mud motor. The drill bit is mounted below the mud motor. Drill bit speeds employed with the drill bits described herein may be in the range of about 100 or 120 r.p.m. to about 150 r.p.m.

Not all of the weight of the drill string bears upon the drill bit. The upper end of the drill string is held back, or held in tension, such that a portion of the weight of the drill collars bears on the drill bit, forcing it forward at the bottom of the well bore. That portion is typically about a third or less, and may be about ¼ or ⅕. That is, where a set of drill collars weighs 36,000 to 50,000 lbs, the string may be held back such that perhaps only about 10,000 to 12,000 lbs bears on the bit.

Given that the drill string is quite long, and given that torque at the drill bit face is reacted by twist in the drill string, the orientation of the body of the mud motor may vary. Also, given that the bit may catch and release, or run slower and then break free, neither the speed of rotation of the drill bit, nor the actual angular position of the mud motor body (i.e., the end of the supposedly non-rotating part of the drill string) is constant. Further still, in addition to noise made by the pumps, the engagement of the drill bit with the end of the borehole and mud motor operation may tend to generate acoustic noise.

Figure 2A:
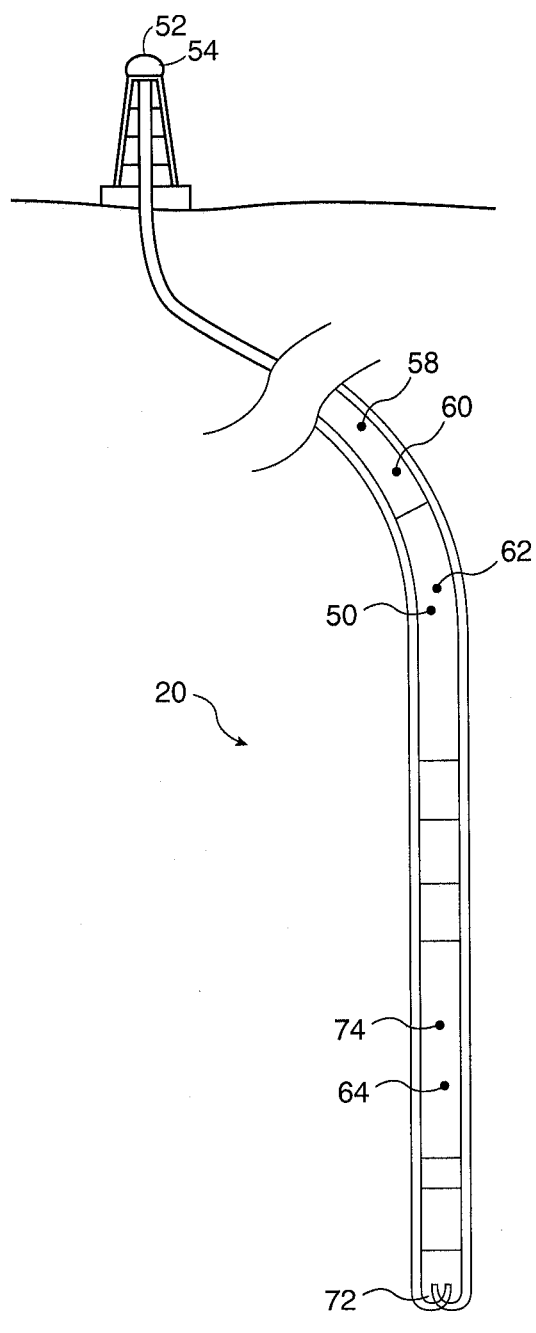
Figure 2B:
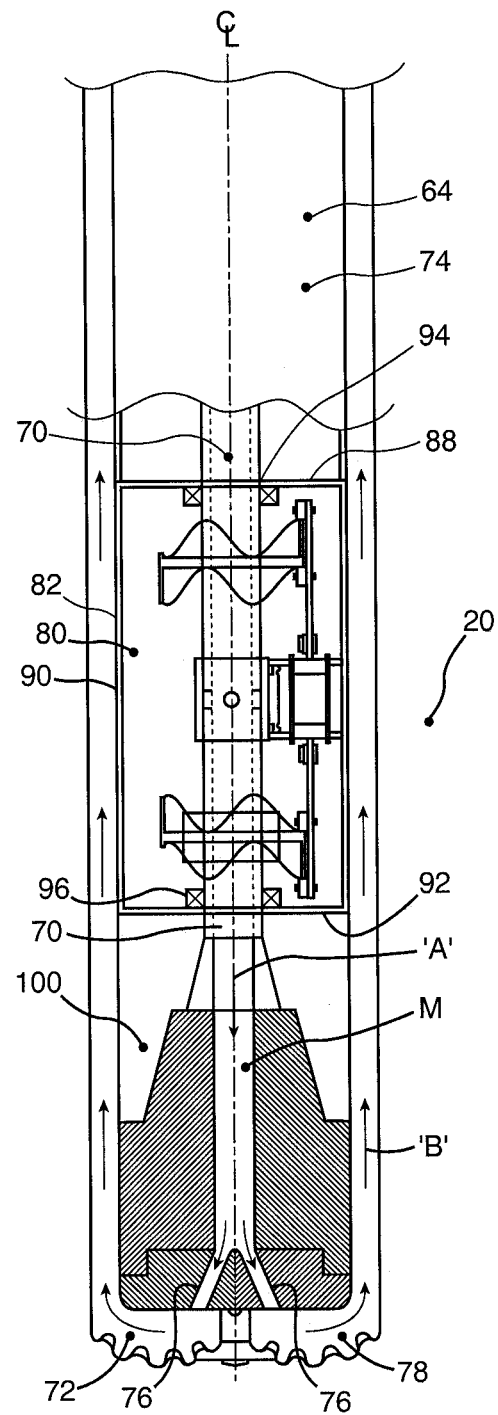
FIG. 2b shows a sectional detail of the drill string end portion of FIG. 2a including an acoustic signal generator.
Figure 3A:
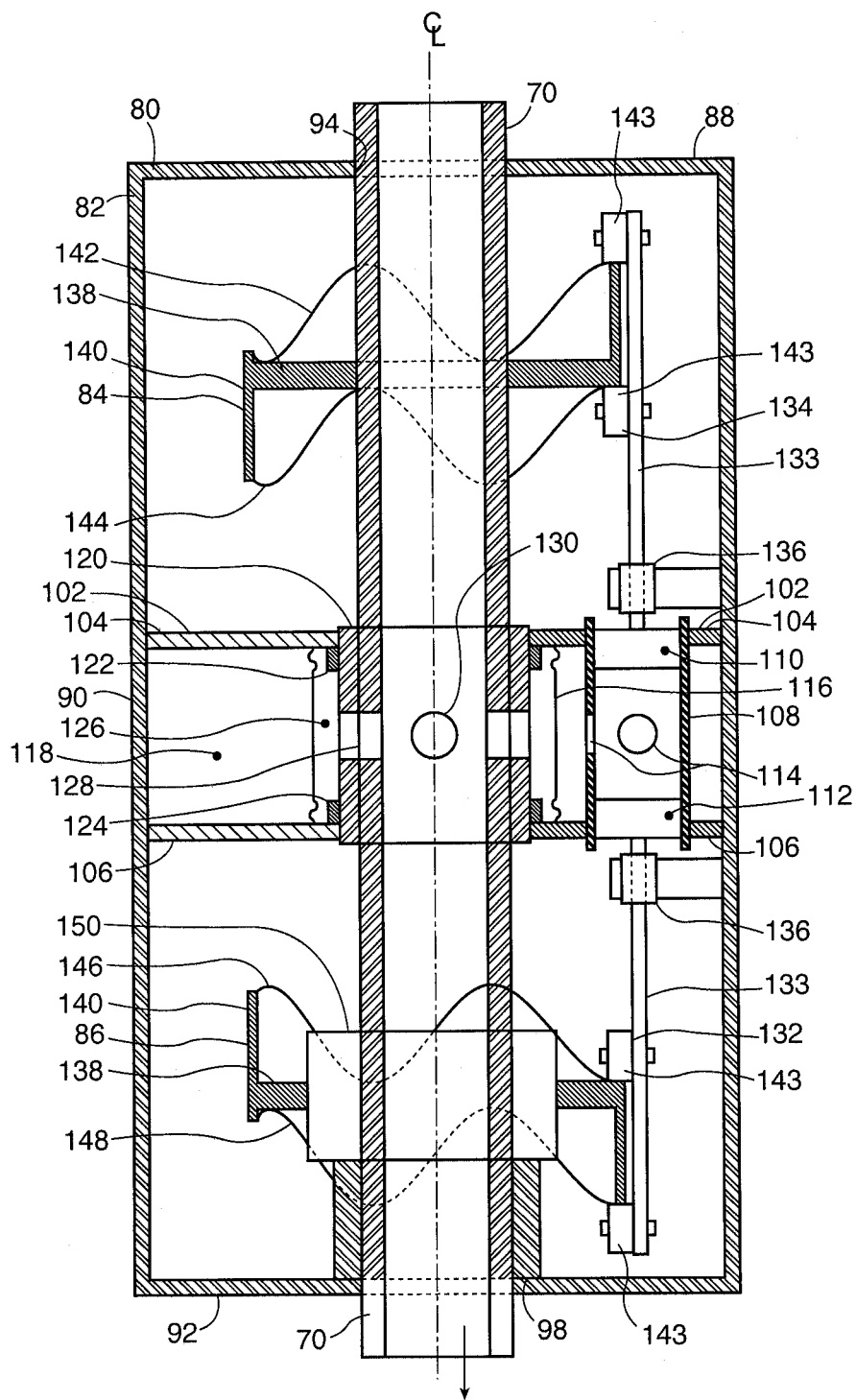
FIG. 3a shows a cross-sectional view of an acoustic signal generator for the end portion of the drill string of FIG. 2b.

In one example, as in FIGS. 2a, 2b and the somewhat conceptual illustration of FIG. 3a, there may be a drill string 50, that extends from head end apparatus 52, which may be a drill rig 54 or a drilling truck, or similar equipment. In this example, the drill string may include conveying pipe 58 that is hollow, and through which drilling mud is pumped under pressure. There may be a regular pipe region 60, and a drill collar region 62. A mud motor 64 may be mounted at the downhole end of drill string 50. In one embodiment, the mud motor may have an inlet for drilling mud, a torque conversion section, which may include a helical impeller, or similar device, which impeller may drive an output shaft 70. A drill bit 72 may be rigidly mounted to the end of output shaft 70, so that when shaft 70 turns, drill bit 72 also turns. The mud motor body 74 is rigidly mounted to the end of the drill string. In this embodiment mud motor body 74 is a stator, having the same angular orientation about the longitudinal axis of the drill string as does the end of the drill string to which it is mounted. I.e., there is no relative rotation between the two. An acoustic emission member, or module, 80 may be mounted between mud motor 64 and drill bit 72. Output shaft 70 is hollow, and carries drilling mud, M, in the direction of arrow 'A' to bit 72. The drilling mud exits through tubes, or bores, or jets, 76 mounted in the face of drill bit 72, between cutters 78, and carries cuttings away from the cutting face and back toward the surface along the annular space defined between the drill string and the borehole wall.

Module 80 may include a body 82 that may be rigidly mounted to the lower end of the mud motor body 74. In this embodiment body 82 may also be a stator. Body 82 may be hollow, and may include a first signal generator assembly 84 and a second signal generator assembly 86, encased within an outer peripheral wall 90, which may be a circular cylindrical wall. Body 82 may also include two transverse end walls, or bulkheads that extend cross wise in the form of annular discs. A first, or upper, transverse wall 88 may provide a flanged interface for connection to the lower end of the mud motor body. The radially outer peripheral margin of wall 88 mates with one end of cylindrical peripheral wall 90. Wall 88 has a central aperture, or penetration 94 through which shaft 70 extends. Penetration 94 may be provided with appropriate seals 96 and bearings or bushings such as may tend to exclude drilling mud. At the far, or lower, end of wall 90 there may be a second transverse wall, or bulkhead, 92, having a radially outer peripheral margin mated with the downhole end of cylindrical peripheral wall 90. This may be a welded connection, or bulkhead 92 and wall 90 may be machined from a single solid part. Bulkhead 92 may have a central aperture 98 through which shaft 70 extends. Seals and suitable bearings or bushings are mounted adjacent aperture 98 to discourage the entry of drilling mud. Cylindrical wall 90 may include an axially extending skirt 100 that extends to sit in close proximity to the axially rearwardly facing annular backface of drill bit 72. In use, inasmuch as there ought to be no pressure difference across the small space, drilling mud may tend to flow rearwardly along the outer generally cylindrical face of the rearward portion of the rotation drill bit, and then over the outside of the skirt face, as at arrow 'B'.

A third member or wall assembly 102 may be located intermediate upper wall 88 and lower wall 92. Assembly 102 may, in effect, define a cylinder block. Assembly 102 may include upper and lower axially spaced apart plates 104 and 106. A cylinder 108 accommodates reciprocation of first and second opposed pistons 110, 112. Cylinder 108 is perforated as at 114 in locations between pistons 110, 112, such that motion of those pistons will tend variably to draw in or expel fluid from the space defined within cylinder 108 and pistons 110, 112. An inner, annular chamber wall or diaphragm 116 extends circumferentially about shaft 70 at a radial distance between shaft 70 and cylinder 108. An annular chamber 118 is then defined radially outside diaphragm 116, radially inside wall 90, and axially between plates 104 and 106. This chamber may be filled with a relatively clean incompressible fluid, such as silicon oil. Shaft 70 may be reinforced by a doubler collar 120 that extends between plates 104, 106. Plates 104, 106 may have annular flanges 122, 124 that have seals that engage collar 120. Another chamber, 126, is thus defined axially between plates 104, 106, radially inwardly of diaphragm 116, and radially outwardly of doubler collar 120. Both doubler collar 120 and shaft 70 have apertures formed therein, as at 128, 130 permitting fluid communication between chamber 126 and the hollow interior of shaft 70. Motion of either or both of pistons 110, 112 will tend to cause diaphragm 116 to flex, and thus to alter the volume of chamber 126, urging drilling mud either into or out of chamber 126. This motion may tend to result in pressure pulses being imposed upon, and being transmitted by, the mud M flowing along shaft 70 and out jets 76. Chamber 126 may be a resonating chamber, or a flexing chamber.

Pistons 110 and 112 are driven by cam followers 132, 134, whose connecting rods 133 may be carried in guides 136. First signal generator apparatus or assembly 84 may include a radially extending cam carrier disc 138 is mounted to shaft 70 and extends radially outwardly therefrom. A peripheral cylindrical cam plate 140 is mounted about disc 138. Cam plate 140 has first and second cam edges 142, 144, upon which upper and lower rollers 143 of cam followers 132, 134 ride. Rotation of shaft 70 will then cause rotation of plate 140 with respect to the (relatively) stationary angular positions of cam followers 132, 134, and will thus cause axial reciprocation of piston 110. Piston 110 may have appropriate seals riding inside the walls of cylinder 108. While piston 110 and cylinder 108 may be circular in cross-section, they may also be non-circular. To the extent that chamber 120 is filled with a substantially incompressible fluid, reciprocation of pistons 110 may cause flexing of the chamber, and the emission of acoustic pressure waves.

Second signal generator assembly 86, which drives piston 112 in substantially the same manner as piston 110 is driven, is substantially similar to first signal generator apparatus or assembly 84, but may differ therefrom in having cam edges 146, 148 that may have a different profile or schedule than those of cam edges 142, 144. Further, second signal generator assembly 86 may include a gear reducer, shown schematically and identified as 150. Gear reducer 150 may have a speed reduction ratio that is a prime number fraction of the rotational speed of shaft 70 more generally, such as $1/7$ or $1/11$, and so on, with a corresponding ratio of rotational speed to the other signal generator assembly.

Although the cams or cam profiles defined by cam edges 142, 144 and 146, 148 may have different shapes or schedules, they may also be the same, as, for example where a gear reducer such as a speed reducer or gear reducer 150 is used. In any case, a first pair of cam schedules 152, 154 are shown in FIGS. 4a and 4b respectively, which may correspond, respectively to the shapes of cam edges 142, 144 and 146, 148. These schedules are shown in terms of rotational angle, one turn of shaft 70 corresponding to 360 degrees of rotation. In both of FIGS. 4a and 4b, which show the cam schedules in developed views (i.e., as if unrolled and laid flat), the rotational position with respect to shaft 70, taken at an arbitrary angular datum, is indicated relative to angle in degrees, 0, 90, 180, 270 and 360 being shown. The waves of the schedules of reciprocation of the pistons are labelled in radians, 0, $\pi$, $2\pi$, $3\pi$, $4\pi$, $5\pi$, $6\pi$, $7\pi$, $8\pi$, and $9\pi$, with the maxima and minima of amplitude occurring at integer multiples of $\pi$. In this annotation, then, the one rotation (i.e., 360 degrees of rotation) of shaft 70 in FIG. 3a equates to $10\pi$, or five cycles, of oscillation or reciprocation of the driven piston, be it 110 or 112, with the waves being of non-uniform wavelength. Cam schedule 152 (FIG. 4a) may be one having a relatively larger number of waves or excursions per cycle than cam schedule 154 (FIG. 4b) of cam 146, as suggested by the difference between FIGS. 4a and 4b, in which schedule 152 has five cycles in 360 degrees, and schedule 154 has one cycle (i.e., in the zone annotated 0, $\pi$, $2\pi$. It may be noted that even this cycle may not be a true sinusoid, but rather one having the mechanical equivalent of frequency modulation, the first half of the cycle from 0 to $\pi$ having, in effect, a different wavelength from the second half of the cycle from $\pi$ to $2\pi$. The waves need not be sinusoids or quasi-sinusoids, but could be other shapes. The choice of cam shape is somewhat arbitrary, and is, in essence, the selection of the shape of an acoustic "key" or signature. The number of cycles chosen is to some extent arbitrary. Although the amplitude of all of the cycles may be equal, this need not necessarily be so. The amplitude of each wave could be different. It may, however, be convenient that the amplitudes be the same, or substantially the same.

In one embodiment, both assemblies 84 and 86 used the same cam schedule, that of FIG. 4a. This schedule 154 of cam 142 may includes a waveform that has waves of different wavelength, as at 156, 158, 160, 162 and 164. It may be that no two consecutive waves of cam schedule 132 are of the same wavelength, or it may be that several waves are of the same wavelength, with one or another waves having a distinctly different wavelength. In each case cam 142 may tend to have a characteristic signature, or key, of a time varying waveform in which the waveform itself is, in a sense, frequency modulated so that a listener (or one having appropriate listening apparatus in the form of sensors and signal processors) may correlate the sound of the wave crests with a particular point in the cycle. As may be appreciated, where the schedules of FIGS. 4a and 4b are used together, without gear reduction, the single distortion of schedule 152 may tend to add a low frequency bump to the higher frequency ripple of schedule 154 once per revolution. It may be that a single cam, cam follower and piston arrangement could be supplied with the combined waveform of both schedule 132 and schedule 134. It may be noted that acoustic emission module 80 is located very close to the drill bit—i.e., it is immediately behind the drill bit, perhaps 2, or 3 feet away, as opposed to as much as 20, 30 or 50 feet away, and the pressure pulses are carried to the work face by jets 76.

Considering wavelengths 156, 158, 160, 162, and 164, again, it may be that these wavelengths vary by a non-harmonic amount. For example, using the first half of wavelength 156 as a datum (i.e., the portion from 0 to $\pi$), the second half wavelength (the portion from $\pi$ to $2\pi$) may be a certain amount shorter. In one embodiment it may be 7% of the datum length shorter. The first half of wavelength 158 (from $2\pi$ to $3\pi$) may be still shorter, this time 14% shorter than the datum length. The second half of wavelength 158 may be shorter again, this time 21% shorter than the datum, and so on by 7% decrements until the last half of wavelength 164 (from $9\pi$ back to 0) is 70% shorter.

If the same pattern is used on a gear reducer at a gear reduction of 7:1, the pattern of superimposed waves will not repeat itself for 49 revolutions of drill shaft 70. For a shaft turning at 150 r.p.m. (relatively fast) this corresponds to roughly 20 seconds. In terms of acoustic sampling and data processing, this is a very long time, and may tend to assist the signal processing equipment in identifying unique points in the pattern. It may also help to keep in mind that the key signatures, both the slow signature of assembly 86 and the fast signature of assembly 84, are repeating signatures of known shape.

Figure 3B:
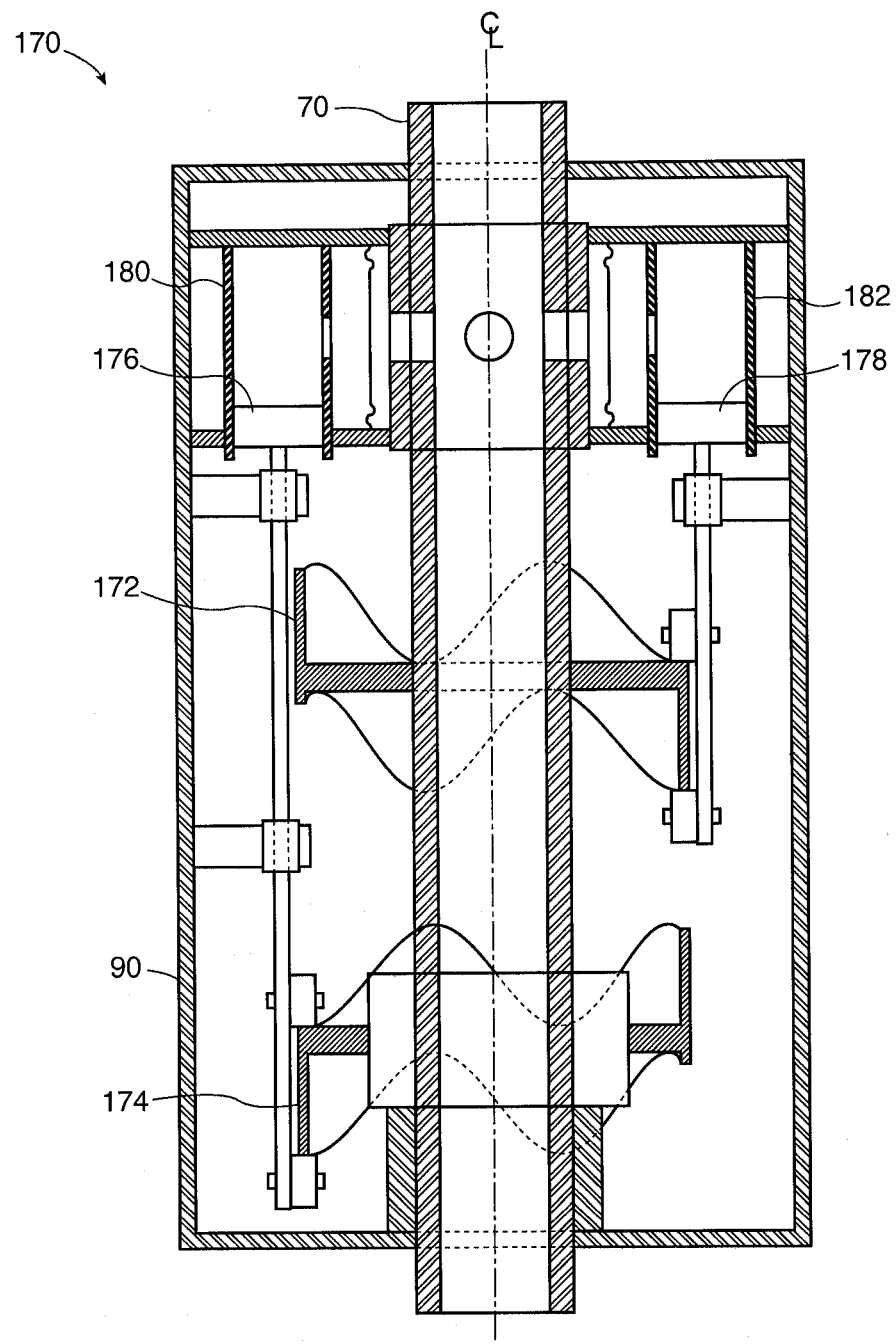

The embodiment of FIG. 3b is intended to illustrate an ASG module 170 in which the cylinder need not be between the two wave generation assemblies, but rather could be at one end, with wave generator assemblies 172, 174 (which correspond to 84 and 86) stacked at one end of body 90, and driving separate pistons 176, 178 in separate cylinders 180, 182 at the other. While this embodiment could be mounted on the end of the mud motor, such an installation, or a conceptually analogous installation could also be mounted within the end of the mud motor sub at or near the location at which the drilling mud re-enters drill shaft 70.

Figure 3C:
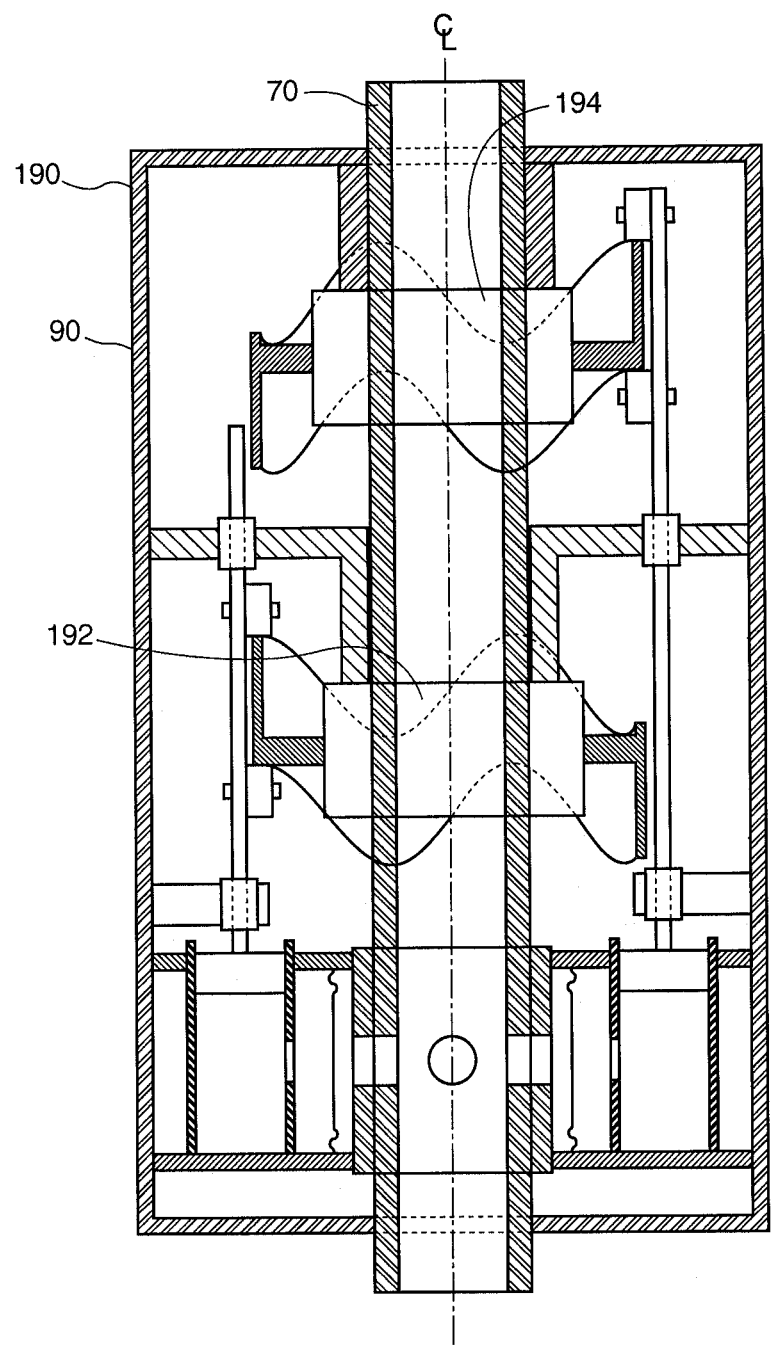

The embodiment of FIG. 3c is intended to illustrate an ASG module 190, which may otherwise be substantially the same as that of either FIG. 3a or 3b, in which each of the wave generators is provided with a gear reducer, be it 192 or 194. These gear reducers may have relatively close gear ratios, such that a beating phenomenon is produced. For example, one gear ratio might be at a reduction of 6.7:1, while the other might be at a reduction of 7.3:1. In another embodiment, one ratio may be 7:1, and other may be 11:1, and so on. As before, the choice of speed ratios may be based on prime numbers (7,11, and 67,73 in the above examples). This might tend to produce a slowly repeating signature, with the characteristic signature sequence of each cam repeating over and over within that longer beating.

Figure 3D:
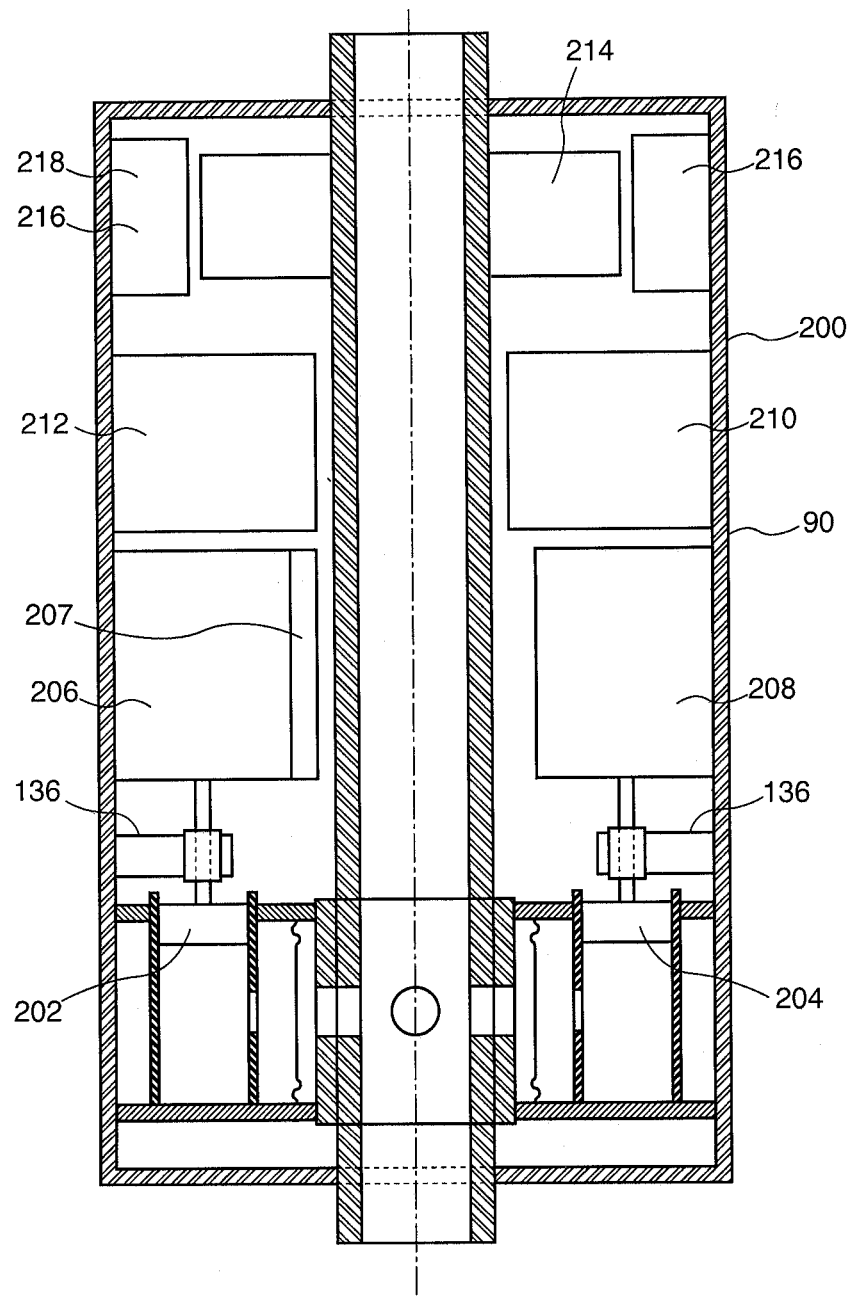

The embodiment of FIG. 3d is intended conceptually to illustrate an ASG 200 in which pistons 202 and 204 are driven by solenoids 206 and 208. Solenoids 206 and 208 are in turn driven according to known electronic schedules (the electronic schedules being analogous to the cams discussed above, and therefore providing the characteristic signature key) from a processor 207 (or from a suitable analogue device) by accumulated charge from positive and negative charge storage devices in the form of capacitor banks 210, 212, which are in turn charged from a dc generator 218 driven by shaft 70 (to which the rotor is mounted) turning within housing 90 (to which the stator is mounted).

In each of these embodiments the mechanical fluid power available in the drilling mud stream is used to drive a mechanical energy conversion device that converts a portion of the energy of the flow into an emitted waveform, the sounds of that wave form (a) being detectable at the surface; and (b) being characteristic, with a known key or signature, that repeats over time.

An array of listening sensors 220 may be located on the surface. Array 220 may include a first listening sensor 222 located at the well head to pick up the acoustic signal emitted by module 80 (or 170, 190 or 200, as may be). There may also be other listening sensors, spaced well away from sensor 222. That is, there may be second, third, fourth and fifth sensors 224, 226, 228 and 230. There may be more than a total of 5 sensors, as broadly illustrated in FIGS. 1a and 1b. The sensors may, for example, be located in a square or diamond shape with sensor 222 at the center. The location of these sensors may be very accurately known, i.e., to the accuracy of laser operated devices. Also quite accurately known is the length of the drill string and its mechanical properties. The drill string penetrates through all variations in geological structure between the wellhead sensor 222 and drill bit 72, and is itself is a relatively effective carrier of acoustic pressure waves. Hence sensor 222 may be mounted to monitor sound in the drill string, and may be used as a reference or datum reading.

The observations of acoustic signals may be fed from sensors 222, 224, 226, 228 and 230 (and any others) to a signal processing apparatus or facility. While this facility may be located in a mobile unit, such as the drill rig truck 232, it may also be remote, and connected by a telecommunications uplink and transmitted by satellite 234 to a distant location. That is, the signal processing facility may be far away in a city or other fixed facility, and need not necessarily be in the field, or even in the same country, as the drilling rig and sensors.

The cam schedules of assemblies 84, 86 (as may be) are known. The signal processor first considers the acoustic signal received at sensor 222, and seeks to find the acoustic signature that would be associated with cam schedules of assemblies 84,86 based on their assumed speed of rotation according to the recorded shaft speed and rotation, and on the first order assumption of a relatively constant speed of rotation of shaft 70. On this assumption, most of the background acoustic noise may be filtered out, leaving the relatively weak emitted signal of cam schedules. The signal processor may start by seeking the slow or coarse signal of assembly 86, may process and refine that signal by digital methods (e.g., by fourier analysis), and may, using those corrections, then seek the fast, or fine, signal of assembly 84. After the initial coarse filtering, the signal processor then makes a fine analysis of the asynchronous variation in period of the signals emitted according to the coarse cam schedule be it 152, 154 or some other as may be. The locations of maxima (points of maximum sound emission) and minima (points of intersection with the time axis at magnitude zero) and the phase shift may be determined. Since the correct proportions of the relative spacing of the maxima and minima is known from the reference key, (the known profile of the waveform of the cam, be it 152 or some other) a time correction factor may be obtained for each portion (e.g., each quarter cycle) of the asynchronous wave form of the key, and the data between the successive maxima and minima stretched (or compressed, as may be) temporally to yield a modified, or adjusted, curve that fits the data to the shape of the reference key. This allows a correction to be made such as may tend to account for twisting, sticking and jumping of the drill bit. Once corrected on this scale, a more accurate approximation of bit rotational speed as a function of time may be made. With this corrected approximation, the signal processing apparatus searches the received downhole acoustic data for the modified frequency modulated signature, or key, of the higher speed cam schedule, applying the corrections previously derived by analysing the variation of the coarse or slow signal as compared to the expected coarse waveform. The received data is analysed again, wave by wave, and the presumed signature is stretched or shrunk, or otherwise modified to match the time variation in the actual signal. From this wave relaxation and fitting process, the signal processor establishes the actual (or close to the actual) shape of the acoustic waveform signal that may be expected to be observed at the other sensors. Again, the background noise of the drill rig is filtered out, tending to leave the desired, relatively higher frequency signal. Although this signal may be relatively weak compared to the background noise of the drilling operation more generally, the ability to perform a signal processing analysis on a waveform of a know shape allows that noise to be filtered out, and allows repetitions of the higher frequency forms to be digitally overlaid, or synthesized to build up a stronger output result. Once filtered, or adjusted in this way, the signal processor analyses the observed waveforms at each sensor working forward in time from the signal received at sensor 222. The signal processor can work in very fine slices of time (of the order of millionths of seconds) and can then work forward until it finds a signal that superimposes well on the signal it seeks. This permits a signal phase shift and travel time to be calculated relative to the signal received at sensor 222. This phase shift in time is a proxy for distance from the drill bit to the sensor in question. This same phase shift determination can be made for each of the sensors. From this phase shift information, and knowing the speed of wave propagation in the underlying geological formation, the signal processor can determine the location of the drill bit to a reasonable level of approximation or accuracy. This is particularly so if such data is recorded and analysed continuously from the time the bit enters the bore at the well head.

In operation, a drill bit may turn at perhaps 100-150 r.p.m., and may advance a few meters per hour into the geological formation. For example, if the drill bit advances 3.6 m per hour, the advance may be of the order of 1 mm per second, or about half a millimetre per revolution. Thus taking a sampling over a period of a minute may give a number of cycles of data corresponding to that generated by 100 to 150 revolutions of the drill shaft, with an advance of perhaps 6 cm (i.e., less than 3 inches, and rather less than one diameter of the drill bore. Even at twice or thrice this speed of forward advance, the introduction of a locational error due to the advance of the bit may tend to be small. For a continuously monitored process, even this source of error may be considered, and an adjustment in the output data made accordingly to improve the approximation. The use of a repeating key, and of digital relaxation of the observed data to match the known shape of the key, may tend to permit many dozens, or hundreds, of data points to be overlaid and summed, yielding a synthesized output signal that is, in effect, computationally enhanced somewhat as if it had been an analogue signal passed through an amplifier, giving an equivalent of a signal hundreds (or perhaps even thousands) of times more powerful than a single pulse.

Furthermore, in traditional electronic telemetry systems, the electrical power available at the downhole location may tend to be quite limited, and may result in signal strengths of 5 or 10 W. Even if the signal strength were 40 of 50 W, that pales in comparison to the power available in the drilling mud, which may be driven by a duplex or triplex pump running at perhaps a few hundred kW. In the embodiment described, the reciprocating position assembly my be running at 4 or 5 hp, i.e., 3-4 kW. This may tend to give a rather large potential signal strength. Furthermore, the point at which this signal strength becomes most apparent is at the head of the drill string where the drilling mud that is subject to the pressure pulse fluctuation exits the face of the drill bit. That is, as compared to past downhole signal emitting apparatus, this arrangement may tend to provide a signal comparatively closer to the actual location of the drill bit.

The art discusses efforts to address the downhole signal strength or signal attenuation issue either by using acoustic repeaters, or by filtering out, or cancelling out either acoustic or EM noise. U.S. Pat. No. 6,781,521 of Gardner appears to be fairly sophisticated in this regard. Techniques of the nature of those described by Gardner tend to be directed toward the problem of identifying a signal where the signal to noise ratio is very small, perhaps of the order of a few thousandths. The signal is encoded, and may tend to be more difficult to find because it is unknown. In the present instance, unlike the prior art, the surface sensors are not looking for a wave of unknown shape, and the wave they are seeking does not carry encoded data. Rather, the shape of the key is known. The listening equipment at the surface can use relatively simple mathematical techniques to hunt for that signal, because (unlike the prior art) the listening equipment in effect, already knows the wavelength and shape of the waveform it is seeking. Taking advantage of the mutual orthogonality of waves of different wavelengths, by working on data from one slice of time at a time, and taking many slices of the observed data per second (the processing equipment has a clock pulse rate in the range of gigahertz, the key has signal cycles, or partial cycles whose effective equivalent frequency is of the order of 1 to 20 Hz, perhaps) multiplying the observed data value by the reference value at each time slice, and summing the squares over the time period of one cycle of the signature, the signal processor can find the best fit, and hence the phase shift of the key (i.e., the signature), and can relax the data (i.e., modify by stretching or shortening the time duration of portions of the wave according to calculated correction factors) until it matches the key fairly closely. That correction or relaxation may then be applied to the data observed at the other listening locations, and the same curve matching algorithm applied. In an alternate embodiment, another technique is to take several periods of data, each having a periodic time duration the length of one cycle of the key signal at the nominal rate of rotation of the drill bit, and repetitively to overlay the data of successive time slices that are spaced apart in time by the period of the cycle, such that the successive key signals sit, at least roughly, on top of one another. In that method, the repetitive key signals may tend to sum continuously, whereas the noise signals, being random, may tend, on average, to sum to zero. As such the key signal may tend to "emerge" from the data, permitting the locations of maxima and minima to be detected, and the phase shift to be determined. Much as before, from this information, first order correction factors may calculated, and then back applied to the raw data, and honed as may be suitable.

The relaxation adjustment factors, or coefficients, may be used to back-calculate a time history of actual, as opposed to nominal, rotation of the drill bit. They may also permit correlation of the signature signals to significant events, or singularities, or perturbations in drill bit operation that may tend to stand out from more random noise. The presence of singularities in the raw data observed at the various sensors of the sensing array may also serve as a further check on the phase shifted matching of the data observed at the various sensors, and of location or other operational parameters. That is, the sound spectrum, or history, of the bit in operation is itself an historically unique record, or fingerprint, of drill bit activity. The identification of the key signal amongst that historically unique record, which on the face may appear to be random, may also permit digital time shifting of the overall sound recorded at the various sensors, such that the record of the bit itself may then be analysed and information extracted therefrom, whether to reinforce calculations of location, or to gain insight into the dynamic operation of the bit, such as acoustic indications of damage or wear on the bit, resonances, whether desirable or undesirable, or of general dullness indicating a time for replacement, or sounds characteristic of passing into a different geological zone or body. That is, once the adjustment coefficients for the various cycles of the signature key are known, and the respective phase shift to be applied at each of the sensors is known, those same coefficients and phase shifts can be applied to the entire sound spectrum of data observed at each of those locations. Since the data observed is not truly random, and notable singularities in the data may stand out, it may be that further information about the actual progress of the bit in the formation may be extracted.

The assumption is made that the speed of the acoustic wave through the various geological strata to the various sensors is approximately the same. That is, the assumption is that the type, number, and relative thicknesses of the strata between the signal source and each listening sensor are at least roughly similar. While this may not be precisely accurate, it may serve as an adequate approximation. Further, to the extent that the geological formation may have been surveyed prior to the commencement of drilling, even differences in the geological medium through which the signals are carried may be the subject of correction factors applied to the observed signals according to the previously gathered data. Further still, even those values can be modified (i.e., updated or made more accurate) on the basis of additional information obtained and recorded as the drilling process proceeds.

It may be noted that the same techniques applied to looking for the key may also be applied to looking for echoes of the key. The echo information provides a second check on the location of the drill bit, and also a check on previous geological data that may have been obtained by seismic surveying prior to drilling. That is, the echoes are indicators of the proximity of the drill bit to formation boundaries. The echo signals are identifiable as echoes because they will be weaker than the primary signals observed.

The presently described apparatus for generating acoustic signals, for observing those signals, for processing those signals, and for extracting information of a practical nature from those observed signals by the application of both classical and digital (i.e., numerical methods) mathematics may occur in conjunction with the collection and transmission of data by means of sensors and coded pulses up the drill string as well. That is, while position may be inferred from the data, temperature may still be sensed downhole, and transmitted back up the drill string. To the extent that nuclear radiation, resistivity, or other sensors for measuring characteristics of the geological formation are desired, one or more or all of those may also be used in conjunction with the present apparatus.

It may be noted that by this process, the depth, latitude, and longitude of the drill bit may be obtained. The pressure at the drill bit may tend to be that of the water column (i.e., drilling mud column) from the surface to that depth and may be comparatively easily determined. The observed data also permits the amount of twist in the drill string to be determined, and the actual speed and rotational displacement of the drill bit to be calculated as a function of time. That is, the phase shift of the signal, and the distortion of the signal in terms of the relaxation required at any observation point, effectively determined as an "error" function, is an indication of both the instantaneous speed of the drill bit as compared to the relatively steady input rotation at the well head, and of the variation in torque applied to the drill bit. The mechanical nature of the drill string may tend to be reasonably well known, both in terms of the length of the drill string, the stretch of the drill string (the weight of the drill collars, the weight of the string generally, and the longitudinal tension or hold-back applied at the well head being known). Further, the flow rate of the drilling mud, and the power input of the drilling mud pump are also known. From this known information, and the positional fix on the drill head, much of the information that might otherwise have been transmitted from the sensors at the drill bit is either no longer required, or inferable through other means. For example, there may no longer be a need to collect or transmit the inclination and azimuth data. To the extent that geological boundary data that might formerly have been collected by sensors mounted to the lower end of the drill string may be collected by surface sensors, the need for those sensors and the collection of that data may be reduced or eliminated. This may yield the benefit of reducing the number of relatively fragile downhole sensors required, and also of reducing the volume of encoded signals to be sent up the drill string. Thus the limit of the low rate of data transmission up the drill string may be a less severe problem, because the need to translate such as volume of data may be correspondingly reduced.

To summarise, the process or method of locating the subterranean tool, such as a drill bit, may include establishing a signal key, i.e., providing an apparatus that has a known, pre-determined key or signature signal, the apparatus including a generator that is operable to cause that characteristic signal to be emitted repeatedly. The key may include a non-harmonic or frequency modulated waveform of, in a sense, unique form. The key may include two or more parts, or portions, and those portions may be emitted on a non-harmonic basis, such that the resultant wave form has an extended period of emission before repetition. The extended period may be obtained by emitting sounds on the basis of sound emission schedules for those portions, whose periods of repetition vary as a ratio of prime numbers. The method also includes provision of sensors, or an array of sensors in sufficient numbers, and establishing, or placing, or distributing, those sensors in an appropriate manner to permit location of the drill bit to be calculated. This calculating may be referred to as triangulation. (The word "triangulation" may tend to imply three sensors. However, "triangulation" is used here in a broader sense, namely that of providing a number of sensors, be it three, four, five, or more, such as may be suitable for establishing a fix of position, e.g., by back calculation from the observed data). The method includes conveying, or placing, or locating, the drill bit in the bore in a subterranean location (which, perforce, may include using the drill bit to form the bore), and rotating the bit as it progresses at the cutting face. This drilling includes the use of drilling mud. The emission of the key signal may include emitting a relatively high power signal (e.g., a signal driven by a power source in excess of about ½ h.p. (about 375 W) or 1 h.p., (about 750 W) or more) To that end the emission of the key signal may include employing an hydraulic power source to drive the signal generator. That hydraulic power source may include the use of drilling mud (which may be predominantly, or in some cases entirely, water), under pressure, as the power transmission medium, as opposed, for example, to an electrical power transmission system obtaining electrical power from a surface source outside the well bore. The method includes monitoring signals at a reference sensor, such as an acoustic sensor, at a known location. The method includes listening for (or monitoring, or sensing) signals emitted during the operation of the bit at the various sensors of the array, including the datum or reference sensor. The reference sensor may be at the wellhead (or, more generically, at the pithead, or the head or start of the bore, however it may be termed). The method may include analysing the observed sounds at the reference sensor to locate or isolate the key signature signal in the observed data. The method may include comparing the observed key signal with the known reference datum key signal. The method may include the determination and application of correction factors to the data to improve the effective quality of the observed signal, or to cause it to match even more closely the known reference of the key signal, and recording the factors or coefficients applied to modify, or refine, the observed signals. The method may include finding the emitted key signal in the sound data observed or sensed at each of the other sensors, and applying the calculated corrections, or correction factors or coefficients to the data observed at those sensors, and from such application to determine the relative phase shift, or relative time delay between the arrival of the signals at the various sensors. The method may include digital determination of location on the basis of relative time delay between the sensors (whose positions are in any case known). The method may include the correction or adjustment of the observed data according to variations in the geological structure, either on the basis of data obtained during the current drilling process being observed, or on the basis of previous observations of geological properties. The method may include adjusting the orientation of the drill bit on a real time basis in response to location (and rate of change of location) information obtained by calculation. The method may include listening at the various sensors for echoes of the key signal such as may reveal further information concerning the relative location of the bit to geological feature such as strata boundaries or other formation features. The method may further include the employment of the key signal as a marker, or trace, or datum, against which to correlate features of the sound profile emitted by the drill bit as observed at the various sensors.

Various embodiments have been described in detail. Since changes in and or additions to the above-described examples may be made without departing from the nature, spirit or scope of the invention, the invention is not to be limited to those details.

I claim:

1. A subterranean position detection apparatus for detecting the position of a drill bit of a drill string, said apparatus comprising:
   an acoustic signal generator, said acoustic signal generator being mounted in proximity to the drill bit;
   said acoustic signal generator having a known acoustic signature;
   sensors mounted remote from said drill bit; said sensors being mounted to monitor subterranean sound in the neighbourhood of the drill string;
   a signal processor connected to receive observations from said sensors;
   said processor being operable to establish a correlation between (a) data from a first of said sensors and (b) said known acoustic signature;
   said processor being operable to apply said correlation to data received at others of said sensors and to measure at least one of (a) respective phase shifts, and (b) travel times, therebetween; and
   said processor being operable to employ at least one of (a) said phase shifts, and (b) travel times, to estimate position of said drill bit; and
   said apparatus is one in which one of:
   (i) said acoustic signal generator includes a first portion and a second portion, and said signature includes a first component emitted by said first portion and a second component emitted by said second portion; and
   (ii) said known acoustic signature of said acoustic signal generator is a made up of a combination that includes a first signature and a second signature.

2. The subterranean position detection apparatus of part (i) of claim 1 wherein said first component is emitted at a different rate than said second component.

3. The subterranean position detection apparatus of claim 2 wherein said first and second components each include a waveform of varied wavelengths.

4. The subterranean position detection apparatus of claim 1, the drill string including a mud motor, and wherein the acoustic signal generator is located between the mud motor and the drill bit.

5. The subterranean position detection apparatus of claim 4 wherein said acoustic signal generator is powered by a flow of drilling mud.

6. The subterranean position detection apparatus of claims 1 wherein said known acoustic signature includes a first key having a first number of oscillations, said oscillations having different wavelengths from each other, a second key having a second number of oscillations, said oscillations having different wavelengths from each other; and said first and second keys are emitted at different rates.

7. The subterranean position detection apparatus of claim 6 wherein said rates have a prime number relationship.

8. The subterranean position detection apparatus of claim 1 wherein said apparatus include both part (i) and part (ii), said first component being said first signature, and said second component being said second signature.

9. The subterranean position detection apparatus of claim 1 wherein any said signature is an acoustic signature and said first sensor is mounted to monitor sound transmitted in said drill string.

10. The subterranean position detection apparatus of claim 1 wherein said known acoustic signature includes a waveform of varied wavelengths.

11. The subterranean position detection apparatus of claim 1 wherein the acoustic signal generator is a controlled sound generator.

12. The subterranean position detection apparatus of claim 1 wherein said array of sensors includes at least three sensors other than said first sensor.

13. The subterranean position detection apparatus of claim 1 wherein said array of sensors includes at least four sensors other than said first sensor.

14. The subterranean position detection apparatus of claim 1 wherein said apparatus includes a satellite communications data uplink and a remote data processing facility.

15. The subterranean position detection apparatus of claim 1 wherein said apparatus includes a mount for the drill bit.

16. The subterranean position detection apparatus of claim 1 wherein said acoustic signal generator is mounted within a mud motor sub.

17. The subterranean position detection apparatus of claim 1 wherein said acoustic signal generator is operable to impose a pressure wavetrain in drilling mud supplied to the drill bit.

18. The subterranean position detection apparatus of claim 1 wherein said acoustic signal generator includes a piston and cam follower operable to produce at least a portion of said known acoustic signature.

19. The subterranean position detection apparatus of claim 1 wherein said acoustic signal generator includes at least one speed reduction apparatus.

* * * * *

UNITED STATES PATENT AND TRADEMARK OFFICE
CERTIFICATE OF CORRECTION

PATENT NO.         : 8,463,548 B2                                    Page 1 of 1
APPLICATION NO. : 12/670468
DATED              : June 11, 2013
INVENTOR(S)        : Paul D. Gies It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this

Eighth Day of September, 2015

Michelle K. Lee
*Director of the United States Patent and Trademark Office*